Figures 1, 2:
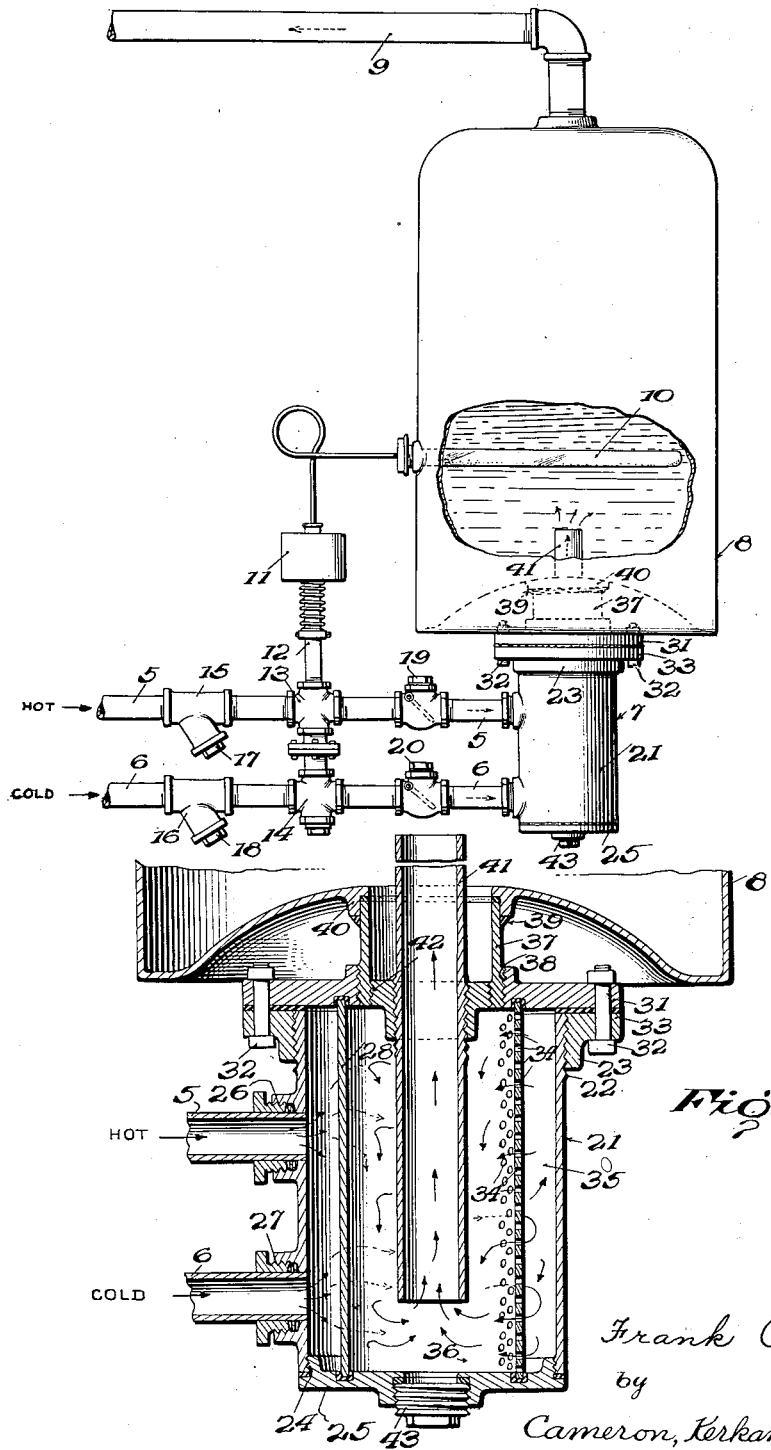

Feb. 26, 1935.　　　F. C. REEDER　　　1,992,581

FLUID CONDITIONING APPARATUS

Filed Aug. 8, 1931

Inventor
Frank C. Reeder
by
Cameron, Kerkam & Sutton
Attorneys

Patented Feb. 26, 1935

1,992,581

UNITED STATES PATENT OFFICE 1,992,581

FLUID CONDITIONING APPARATUS

Frank C. Reeder, Knoxville, Tenn., assignor to The Fulton Sylphon Company, Knoxville, Tenn., a corporation of Delaware Application August 8, 1931, Serial No. 556,025

10 Claims. (Cl. 137—111)

This invention relates to fluid conditioning apparatus and more particularly to an apparatus in which a plurality of fluids vary the condition of each other by mixture and in which the flow of the individual fluids is controlled by the condition of the mixture.

One of the objects of the present invention is to provide an apparatus for conditioning a fluid having novel structural features for increasing the efficiency of apparatus heretofore used.

Another object of the present invention is to provide a novel mixing nozzle for fluid conditioning apparatus in which a plurality of fluids in different conditions are caused to follow a continuously changing path and are twice reversed in their direction of flow for thoroughly mixing the same.

Still another object of the present invention is to provide a novel mixing nozzle for fluid conditioning apparatus which is simple and compact, cheap to manufacture, and efficient for the purpose intended.

These and other objects will become more apparent from the following description and drawing in which like reference characters denote like parts throughout the several views. It is to be understood, however, that the drawing is for the purpose of illustration only and is not a definition of the limits of the invention, reference being had for this purpose to the appended claims.

In the drawing:

Fig. 1 is a side elevational view of a fluid conditioning apparatus incorporating the present invention; and Fig. 2 is a side elevational view in section of the mixing nozzle shown in Fig. 1.

The fluid conditioning apparatus embodying the present invention is capable of a variety of uses but for purposes of illustration is shown in Fig. 1 as adapted to mix hot and cold water for bath purposes and includes a hot water conduit 5 and a cold water conduit 6. These conduits supply the hot and cold fluids to one side of a mixing device 7, which discharges the fluids in a thoroughly mixed condition into a receiving tank 8, and from which the mixed fluid may be drawn off through conduit 9 to a utilizing apparatus (not shown) such as a spray shower, bath tub, swimming pool or the like.

The temperature of the mixed fluid in the tank 8 is varied by varying the proportionate amounts of hot and cold fluids entering the mixing device 7 through the conduits 5 and 6, and is governed by the temperature of the mixed fluid in the receiving tank 8. To this end a thermostat 10 within the tank 8 actuates a motor 11 which in turn is connected with a valve rod 12 for actuating multiple valves 13 and 14 in the conduits 5 and 6 respectively. The thermostat unit including the motor and valves may be of any suitable construction. The valves 13 and 14 are preferably of a slotted sleeve construction in which movement of the rod 12 in one direction causes a plunger to uncover an increasing slotted area of the sleeve in one valve and a decreasing slotted area of the sleeve in the other valve, and vice versa when the valve rod 12 is moved in the opposite direction, so that the proper proportion of hot and cold water may be had by the proper setting of the valve mechanism by the thermostat.

Cleaning screens 15 and 16 are preferably provided in the conduits 5 and 6 for preventing any foreign matter held in mechanical suspension from entering the apparatus, these screens being of any suitable form with plugs 17 and 18 allowing removal of the screens. Between the valves 13 and 14 and the mixing device 7 oneway valves 19 and 20 are provided for preventing any back flow from the tank 8.

The mixing nozzle of novel construction, generally referred to as 7 in Fig. 1, includes an outer cylindrical shell 21 shown as having a screwthreaded connection 22 with a flange 23 at one end, and a screw-threaded connection 24 with a head plate 25 at the other end. At one side this outer shell 21 is provided with suitable apertures and connecting means 26 and 27 for receiving the ends of the conduits 5 and 6. A second cylindrical shell 28 is positioned within the outer shell 21 and is arranged concentrically therewith having one end suitably positioned against the end plate 25 and the other end suitably positioned against a flange plate 31, the flanges 23 and 31 being connected by means of a series of bolts 32 with a packing 33 therebetween. This inner cylindrical shell 28 is perforated as at 34 on the side opposite from the connecting means 26 and 27 on the outer shell 21, the perforations covering a small circumferential area but extending the entire length of the shell. With the construction thus far described, the inner and outer shells 28 and 21 define an outer annular chamber 35 between the two shells and an inner annular chamber 36 within the shell 28, and the fluids entering through the conduits 5 and 6 are caused to follow a continually changing path through the chamber 35 and are discharged through the perforations 34 into the chamber 36 causing a complete reversal in the direction of flow.

The whole mixing device thus far described is supported by a sleeve 37 shown as having a screw-threaded connection 38 with the flange 31. The other end of this sleeve 37 is rigidly attached to the receiving tank 8 by any suitable means such as welding at a joint 39, an annular boss 40 being provided on the tank 8 for this purpose.

A conduit 41 within the sleeve 37 extends into the receiving tank at one end and into the chamber 36 at the other end, to a position near the bottom of the chamber. This conduit 41 is supported intermediate its ends as by a screw-threaded connection with a member 42 connected at its outer periphery with the inside of sleeve 37. The mixed fluids entering the chamber 36 through the perforations 34 are caused to flow downwardly to the bottom of the chamber to enter the open end of the conduit 41 and then upwardly through the conduit into the receiving tank 8. In this flow of the fluid the direction of the path continually changes from a horizontal to a vertical direction and is again reversed causing a more intimate mixture of the separate fluids.

A drain plug 43 is provided at the center of the plate 25 for draining the mixing device and removing foreign substances and scale which may accumulate within the chamber 36.

As will be readily apparent, by providing an outer cylindrical shell 21, an inner shell 28 and a conduit 41 concentrically arranged with respect to each other, a very compact construction results. It will also be apparent that with this construction the annular chamber 35 with its continually changing path horizontally and the chamber 36 and conduit 41 with their continually changing path vertically, cause two reversals in direction of flow which give a very efficient mixing of the two fluids before they are discharged into the receiving tank 8. Further, as the outer and inner shells and conduit 41 may be made of standard pipe and the connecting means of standard flanges, an apparatus has been provided which besides being simple and compact and efficient for the purpose intended may be also cheaply manufactured.

It is to be expressly understood that the mixing device shown and described is capable of a variety of mechanical embodiments and that many changes in the shape, size and details of construction may be made without departing from the spirit of the invention. If preferred the parts may be welded together instead of having threaded connections, the outer shell 21 may be cast integrally with the flange 23 and head plate 25, and other changes in the manner of construction and assembly may be used without departing from this invention. Further the novel mixing device may be used in conjunction with other apparatus than that illustrated and is not limited to such use. Different fluids may be used than water at different temperatures, where it is desired to thoroughly mix the same before discharging them into a receiving tank. The valve mechanism in the conduits 5 and 6 may also be actuated by a pressure condition within the receiving tank 8 instead of the thermostat shown and described without departing from the spirit of the present invention, and reference is therefore to be had to the appended claims.

What is claimed is:

1. In a fluid conditioning apparatus having means for supplying a plurality of fluids, means for mixing said fluids comprising an outer chamber in communication with the supply means on one side, and an inner chamber adapted to receive the fluids only on the side thereof remote from said supplying means, said outer chamber being formed with an outer wall of such contour as to continually change the path of flow and said inner chamber being formed with an inner wall deflecting the flow axially therethrough.

2. In a fluid conditioning apparatus having conduits for supplying a plurality of fluids, means for mixing said fluids comprising inner and outer shells forming a space therebetween, said conduits communicating with the space between said shells for supplying the fluids on one side, and said inner shell having perforations for discharging the fluids into the inner shell only at the opposite side, and means interiorly of said inner shell for causing the fluid to flow axially thereof in opposite directions whereby said fluids in traversing said shells will be thoroughly mixed.

3. In a fluid conditioning apparatus having conduits for supplying a plurality of fluids, means for mixing said fluids including an inner and an outer shell forming a first chamber therebetween into which said conduits deliver, and a second chamber within said inner shell, said conduits communicating with the first chamber on one side through the outer shell, and said first chamber delivering into said second chamber only through perforations in said inner shell at the side opposite said conduits, means in said second chamber for reversing the direction of flow of the fluid therein, and a delivery conduit extending from said second chamber.

4. In combination with conduits for supplying a plurality of fluids, a mixing device comprising a cylindrical shell connected with said conduits at one side, a second cylindrical shell arranged within said first named shell and perforated only at the opposite side from the connections with the conduits, and a conduit positioned within said inner shell and extending from adjacent the end thereof whereby the fluids in passing through the mixing device have a continuously changing path in which the direction of flow is twice reversed to insure a thorough mixing.

5. In combination with conduits for supplying a plurality of fluids, a mixing device comprising a cylindrical shell connected at one side with said conduits, a second cylindrical shell within said outer shell concentric therewith and having perforations only at the side opposite from the connections with the conduits, a conduit within said inner shell extending from adjacent the end thereof, a head at one end for closing said inner and outer shells, and a head at the other end surrounding the outlet conduit and closing the space between the inner and outer shells, whereby the fluids in passing through the mixing device have a continuously changing path in which the direction of flow is twice reversed to insure a thorough mixture.

6. In a fluid conditioning apparatus including conduits for supplying a plurality of fluids, a mixing device in communication with said conduits comprising inner and outer shells forming a chamber therebetween of such contour as to continually change the path of flow, said conduits communicating with the chamber on one side through the outer shell and said inner shell having perforations on the side opposite said conduits, and means in said inner shell for deflecting the mixture flowing through said perforations axially of said inner shell.

7. In a fluid conditioning apparatus having conduits for supplying a plurality of fluids, a mixing device in communication with said conduits comprising an annular chamber through which the fluids pass circumferentially from the side communicating with said conduits to the opposite side, a second annular chamber into which the partially mixed fluids are discharged from the first annular chamber on the side opposite said conduits and through which the fluids are directed axially, and a discharge conduit extending axially from the second chamber and through which the fluid flows in the opposite direction from that in said second annular chamber.

8. In a fluid mixing device, an annular chamber adapted to receive a plurality of fluids at one side and direct the same to the other side, a second annular chamber concentrically arranged within the first named chamber adapted to receive the partially mixed fluid discharged from the first annular chamber and direct the fluid axially, and a discharge conduit extending from adjacent the end of said second chamber axially out of said device through which the fluids are directed and thoroughly mixed.

9. In a fluid mixing device, a receiving chamber comprising inner and outer shells forming a space therebetween, said outer shell adapted to receive a plurality of fluids at one side, said inner shell having perforations only on the side opposite from the side where the plurality of fluids is received whereby the fluids will be caused to flow from one side of the receiving chamber to the other and through said perforations, and means inside of said inner shell for deflecting the fluid flowing through said perforations axially of said shell and causing a thorough mixing of the same.

10. In a fluid mixing device, an outer cylindrical shell and an inner cylindrical shell forming a chamber therebetween and a chamber within the inner shell, said outer shell being adapted to receive a plurality of fluids on one side and said inner shell having perforations on the other side for discharging the fluids from the outer to the inner chamber, and a conduit extending from adjacent one end of said inner chamber axially out of said device through the opposite end.

FRANK C. REEDER.